United States Patent
Yeh et al.

(10) Patent No.: US 8,491,000 B2
(45) Date of Patent: Jul. 23, 2013

(54) FOLDING STROLLER

(75) Inventors: Chuan-Ming Yeh, Chuayi (TW);
Wei-Yeh Li, Tainan County (TW)

(73) Assignee: Lerado (Zhong Shan) Industrial Co., Ltd., Zhong Shan, Guang Dong Province (CN)

( * ) Notice: Subject to any disclaimer, the term of this patent is extended or adjusted under 35 U.S.C. 154(b) by 413 days.

(21) Appl. No.: 12/837,199

(22) Filed: Jul. 15, 2010

(65) Prior Publication Data
US 2011/0012324 A1 Jan. 20, 2011

(30) Foreign Application Priority Data

Jul. 16, 2009 (CN) .......................... 2009 1 0157909

(51) Int. Cl.
*B62B 7/06* (2006.01)
(52) U.S. Cl.
USPC .......................................... 280/642; 280/647
(58) Field of Classification Search
USPC ............... 280/648, 47.38, 47.39, 47.4, 47.41
See application file for complete search history.

(56) References Cited

U.S. PATENT DOCUMENTS

| | | | | |
|---|---|---|---|---|
| 5,201,535 | A * | 4/1993 | Kato et al. ....................... | 280/30 |
| 5,676,386 | A * | 10/1997 | Huang ............................ | 280/30 |
| 5,772,279 | A * | 6/1998 | Johnson, Jr. .................. | 297/130 |
| 5,865,447 | A * | 2/1999 | Huang ............................ | 280/30 |
| 5,947,555 | A * | 9/1999 | Welsh et al. .................. | 297/130 |
| 6,241,274 | B1 * | 6/2001 | Huang .......................... | 280/642 |
| 6,286,844 | B1 * | 9/2001 | Cone et al. ................. | 280/47.41 |
| 6,331,032 | B1 * | 12/2001 | Haut et al. ..................... | 297/130 |
| 6,398,233 | B1 * | 6/2002 | Liang et al. .................... | 280/30 |
| 6,446,990 | B1 * | 9/2002 | Nania et al. .............. | 280/47.371 |
| 6,513,827 | B1 * | 2/2003 | Barenbrug .................... | 280/648 |
| 6,893,040 | B2 * | 5/2005 | Hou et al. ..................... | 280/642 |
| 7,017,921 | B2 * | 3/2006 | Eros ............................ | 280/47.38 |
| 7,032,922 | B1 * | 4/2006 | Lan .............................. | 280/648 |
| 7,267,359 | B1 * | 9/2007 | Yang et al. .................... | 280/642 |
| 7,377,537 | B2 * | 5/2008 | Li ................................ | 280/650 |
| 7,584,985 | B2 * | 9/2009 | You et al. ..................... | 280/643 |
| 7,658,399 | B2 * | 2/2010 | Van Dijk ...................... | 280/642 |
| 7,681,894 | B2 * | 3/2010 | Santamaria ................. | 280/47.38 |
| 7,766,366 | B2 * | 8/2010 | Li ................................ | 280/642 |
| 7,789,402 | B2 * | 9/2010 | Saville et al. ............. | 280/47.38 |
| 7,922,182 | B2 * | 4/2011 | Van der Vegt ............. | 280/47.36 |
| 7,938,435 | B2 * | 5/2011 | Sousa et al. ................. | 280/658 |
| 8,029,014 | B2 * | 10/2011 | Ahnert et al. ................ | 280/650 |
| 8,033,555 | B2 * | 10/2011 | Mostert et al. ............ | 280/47.38 |
| 8,128,119 | B2 * | 3/2012 | Saville et al. ................ | 280/648 |
| 8,240,700 | B2 * | 8/2012 | Greger et al. ................ | 280/648 |
| 8,251,382 | B2 * | 8/2012 | Chen et al. ................. | 280/47.41 |
| 2006/0119079 | A1 * | 6/2006 | Yoshie et al. ................ | 280/648 |
| 2007/0045975 | A1 * | 3/2007 | Yang .......................... | 280/47.38 |
| 2008/0179848 | A1 * | 7/2008 | Lake .......................... | 280/47.41 |
| 2008/0303232 | A1 * | 12/2008 | Chen et al. ................. | 280/47.41 |

(Continued)

*Primary Examiner* — Jeffrey J Restifo
(74) *Attorney, Agent, or Firm* — Morris Manning & Martin, LLP; Tim Tingkang Xia, Esq.

(57) ABSTRACT

A folding stroller comprises a stroller frame and a foldable and detachable seat (4), the stroller frame (10) having a supporting rack (14) for providing a first engaging site (2) and a second engaging site (3). The foldable and detachable seat (4) can connect to the stroller frame (10) at the first engaging site (2) and the second engaging site (3), and can be released from the first engaging site (2) by folding its seat back (42), and thereafter disengaging from the second engaging site (3) by pulling a releasing member (64).

12 Claims, 9 Drawing Sheets

U.S. PATENT DOCUMENTS

| | | | |
|---|---|---|---|
| 2009/0127810 A1* | 5/2009 | Dotsey et al. | 280/47.371 |
| 2009/0127827 A1* | 5/2009 | Pike et al. | 280/648 |
| 2009/0256323 A1* | 10/2009 | Mostert et al. | 280/47.38 |
| 2010/0109272 A1* | 5/2010 | Ahnert et al. | 280/47.38 |
| 2010/0171289 A1* | 7/2010 | Greger et al. | 280/648 |
| 2011/0233903 A1* | 9/2011 | Williams et al. | 280/648 |

* cited by examiner

FOLDING STROLLER

FIELD OF THE INVENTION

The invention relates to a folding stroller, and more particularly, to a stroller frame comprising a seat separated by folding seat back and pulling a releasing member under seat base thereof.

DESCRIPTION OF THE RELATED ART

For normal use and facilitate to stow and transportation, the stroller is normally designed to be foldable, thereby to obtain a compact size when being not in use.

A traditional foldable stroller frame, typically comprise a front strut, a rear strut, a seat and a push bar for pushing the stroller. Some of the seat can be folded when the folding of the stroller frame but may not be separated from the stroller frame, and some of the seat can be separated from the stroller frame, but may not be folded to reduce its size. Both of the seat type make the stroller may not convert to a fully compact size, this could not meet the need for stowing and transportation.

SUMMARY OF THE INVENTION

An object of the present invention is to provide a folding stroller comprising a stroller frame and a foldable and detachable seat, wherein the stroller frame has a supporting rack for providing a first engaging site and a second engaging site. The foldable and detachable seat can connect to the stroller frame at the first engaging site and the second engaging site, and can release from the first engaging site by folding the seat back, and thereafter disengaging from the second engaging site by pulling a releasing member.

BRIEF DESCRIPTION OF THE DRAWINGS

The accomplishment of this and other objectives and the range of suitability of the application of the invention will become apparent from the following description and its accompanying drawings of which.

DETAILED DESCRIPTION OF THE PREFERRED EMBODIMENT

Figure 1:
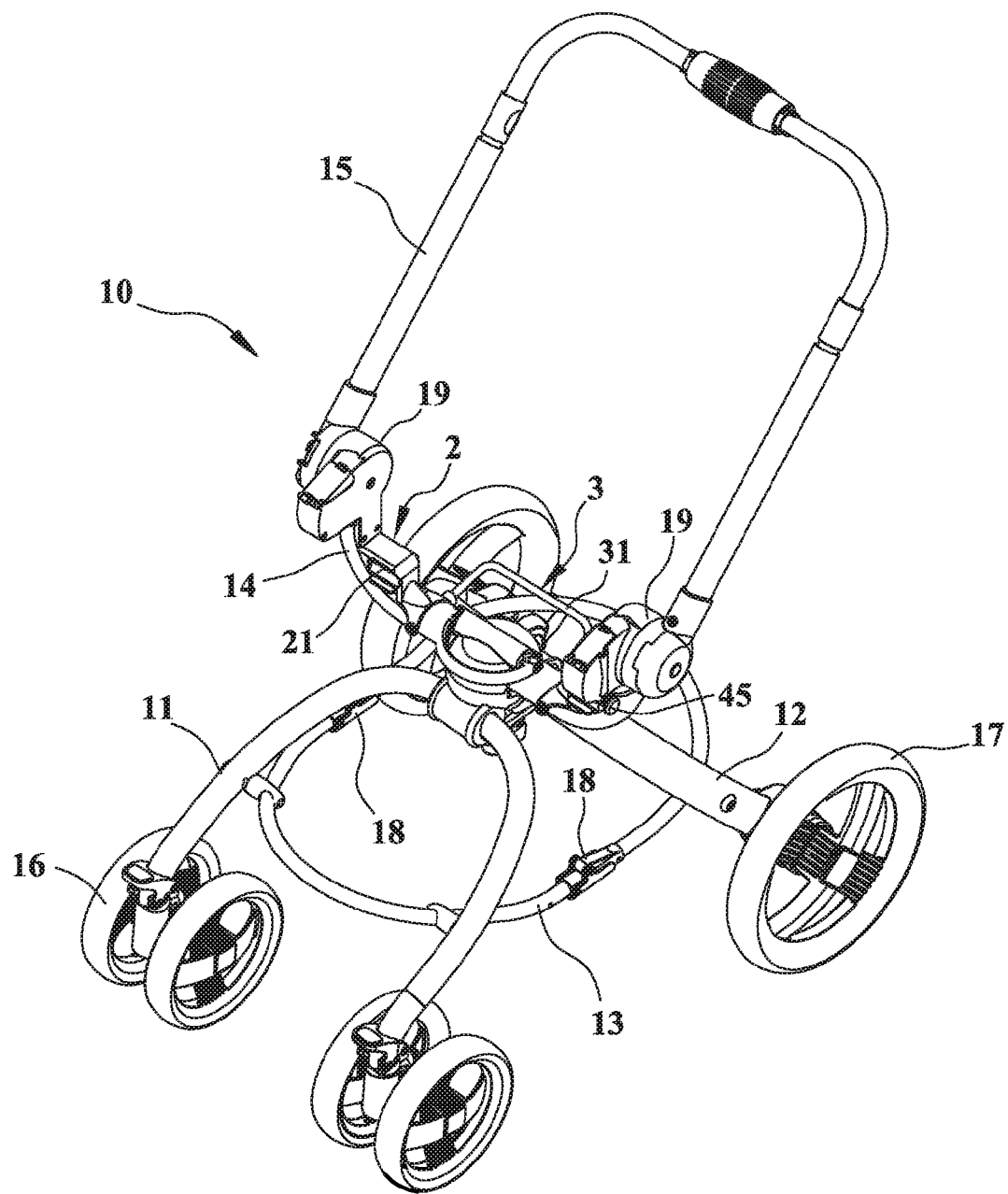
FIG. 1 is schematic perspective view illustrating a folding stroller with a foldable and detachable seat according to the present invention.
Figure 2:
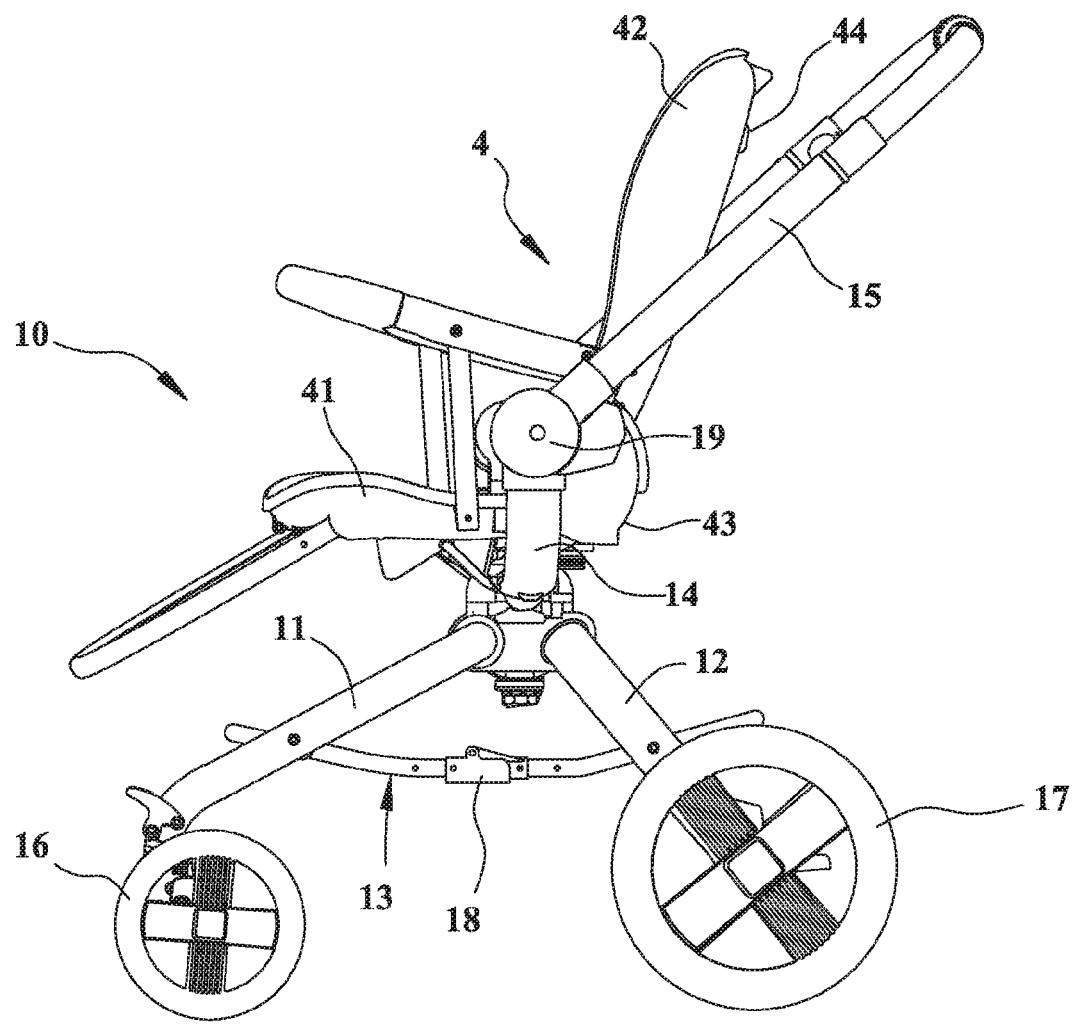
FIG. 2 is schematic side view illustrating the folding stroller with the foldable and detachable seat according to the present invention.

Referring to FIGS. 1 and 2, a preferred embodiment of the folding stroller of the present invention, comprises a stroller frame 10 and a foldable and detachable seat (4). The stroller frame (10) has a supporting rack (14) that provides a first engaging site (2) and a second engaging site (3). The foldable and detachable seat (4) connects to the stroller frame (10) at the first engaging site (2) and the second engaging site (3), and releases from the first engaging site (2) by folding its seat back (42), and thereafter disengaging from the second engaging site (3) by pulling a releasing member (64).

The stroller frame (10) includes at lease a front strut (11) and a rear strut (12) pivoted with the front strut (11), both can rotate in a predetermined angle range in an open or deployed configuration; and rotate to close to each other in a close configuration, when folding the stroller frame 10.

The front strut (11) connects a front wheel assembly (16), and the rear strut (12) connects a rear wheel assembly (17) that forms a wheeled frame to support the supporting rack (14).

For pushing such a wheeled frame, the supporting rack (14) may comprise a pair of pivot mount (19) for connecting a push bar (15).

For limiting the maximal angle between the front strut (11) and the rear strut (12), the stroller frame 10 may further comprise a connecting rack (13) pivoted between the front strut (11) and the rear strut (12).

The connecting rack (13) may include a pair of rods connected to each other with a joint (18), lockable in a straight configuration, and foldable to close to each other when folding the stroller frame (10).

Figure 3:
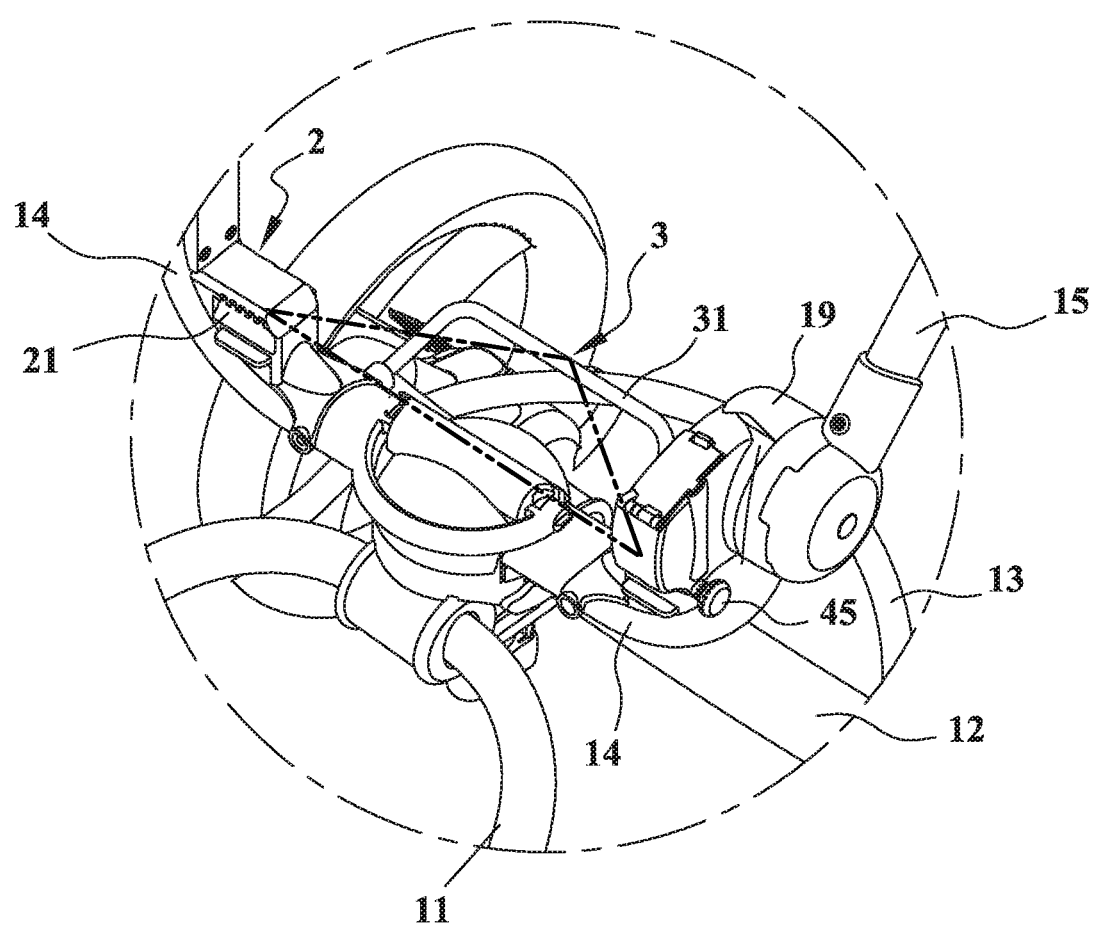
FIG. 3 is schematically illustrating the first engagement site and the second engagement site provided by the supporting rack.
Figure 4:
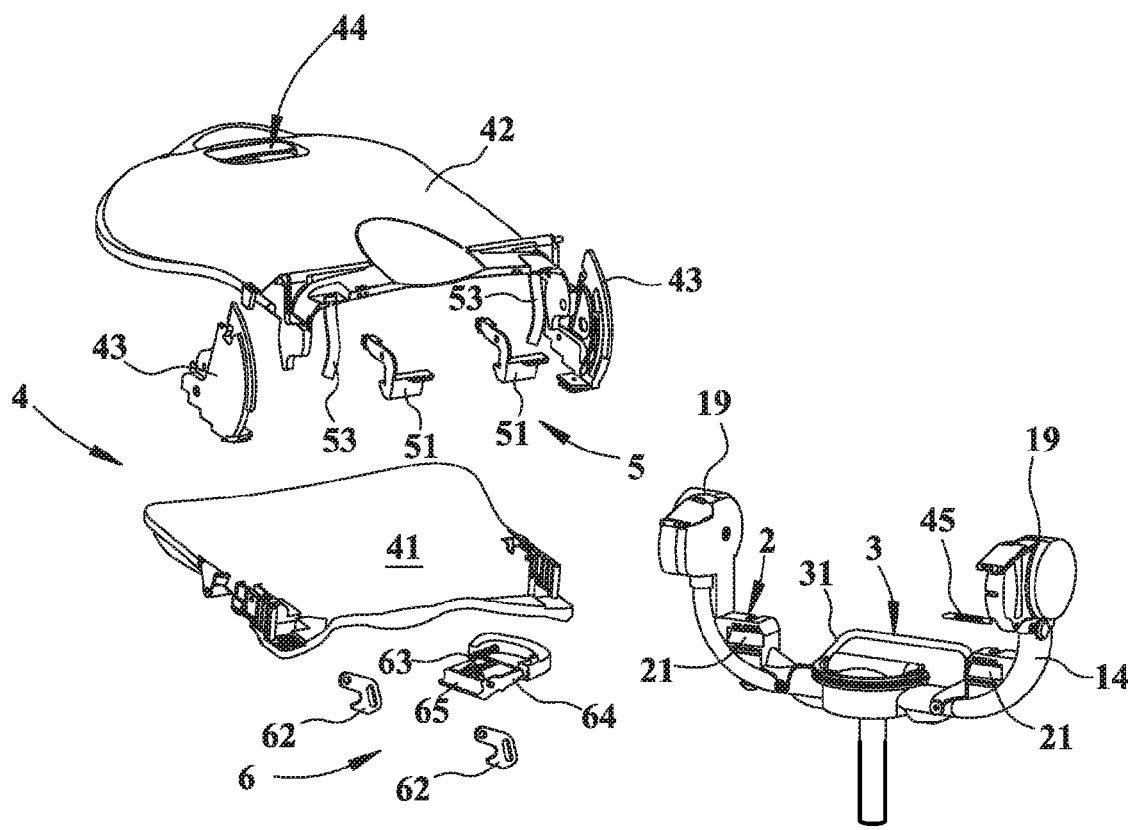
FIG. 4 is an exploded view of the foldable and detachable seat and the supporting rack.
Figure 5:
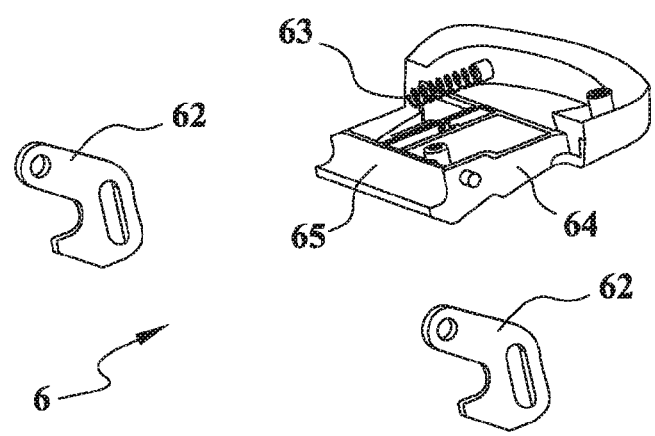
FIG. 5 is an enlarged exploded view of the second engaging mechanism of the foldable and detachable seat.
Figure 6:
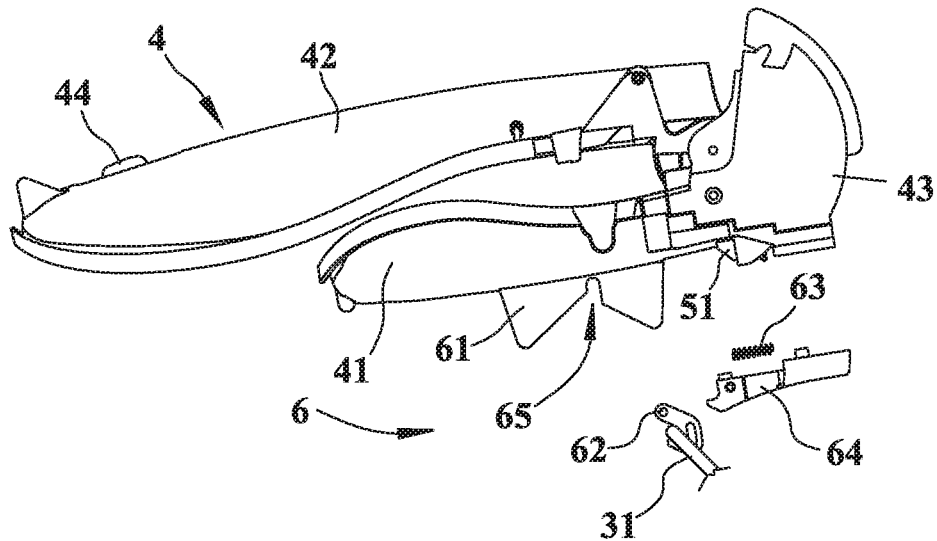
FIG. 6 is schematic side view of the foldable and detachable seat disengaged from the stroller frame.
Figure 7:
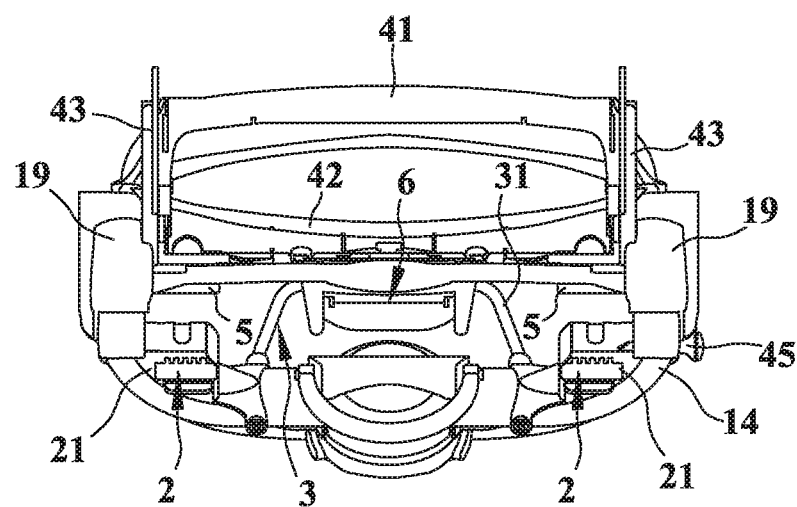
FIG. 7 is schematic front view of the foldable and detachable seat disengaged from the first engaging site.

Referring to FIGS. 3 and 4, the first engaging site (2) of the supporting rack (14) provides a pair of fixing slot mount (21) for engaging with the foldable and detachable seat (4); and the second engaging site (3) of the supporting rack (14) provides a U-shaped fixing rod (31). When the foldable and detachable seat (4) engaged with the supporting rack (14), the first engaging site (2) and the second engaging site (3) provide at least three connecting points to lock the foldable and detachable seat (4) thereon.

Referring to FIGS. 4 to 8, the foldable and detachable seat (4) comprises at least a seat base (41), a seat back (42), a multi-positioning mount (43) and an angle-control mechanism (44). The multi-positioning mount (43) pivotally connected the seat base (41) to the seat back (42), and the angle-control mechanism (44) allows the seat back (42) to position in a selected angle range between 90 degree and 180 degree.

Each of the pair of pivot mount (19) may have a limiting member (45) functioning to retractably insert into the multi-positioning mount (43) for preventing the close angle between the seat back (42) and seat base (41) folding to less than 90 degree, when the stroll is in using.

The seat base (41) has a first engaging mechanism (5) for engaging with the pair of fixing slot mount (21) at the first connecting site (2), and a second engaging mechanism (6) for engaging with the fixing rod (31) at the second connecting site (3).

The first engaging mechanism (5) may comprise a spring-loaded member (51) and a connecting member (53). The spring-loaded member (51) engages with the fixing slot mount (21) and connects with the seat back (42).

Figure 8:
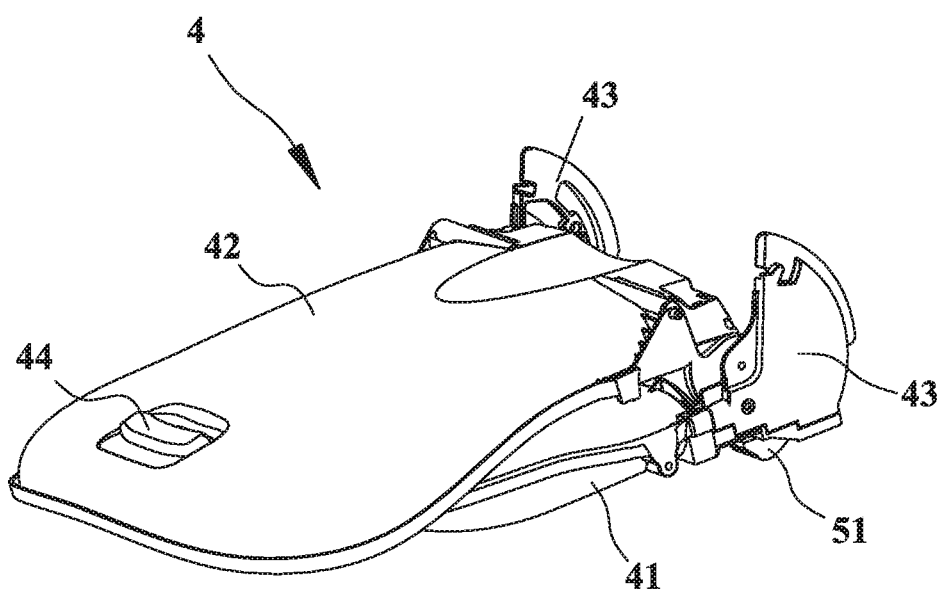
FIG. 8 is a perspective view of the foldable and detachable seat disengaged from the stroller frame.
Figure 9:
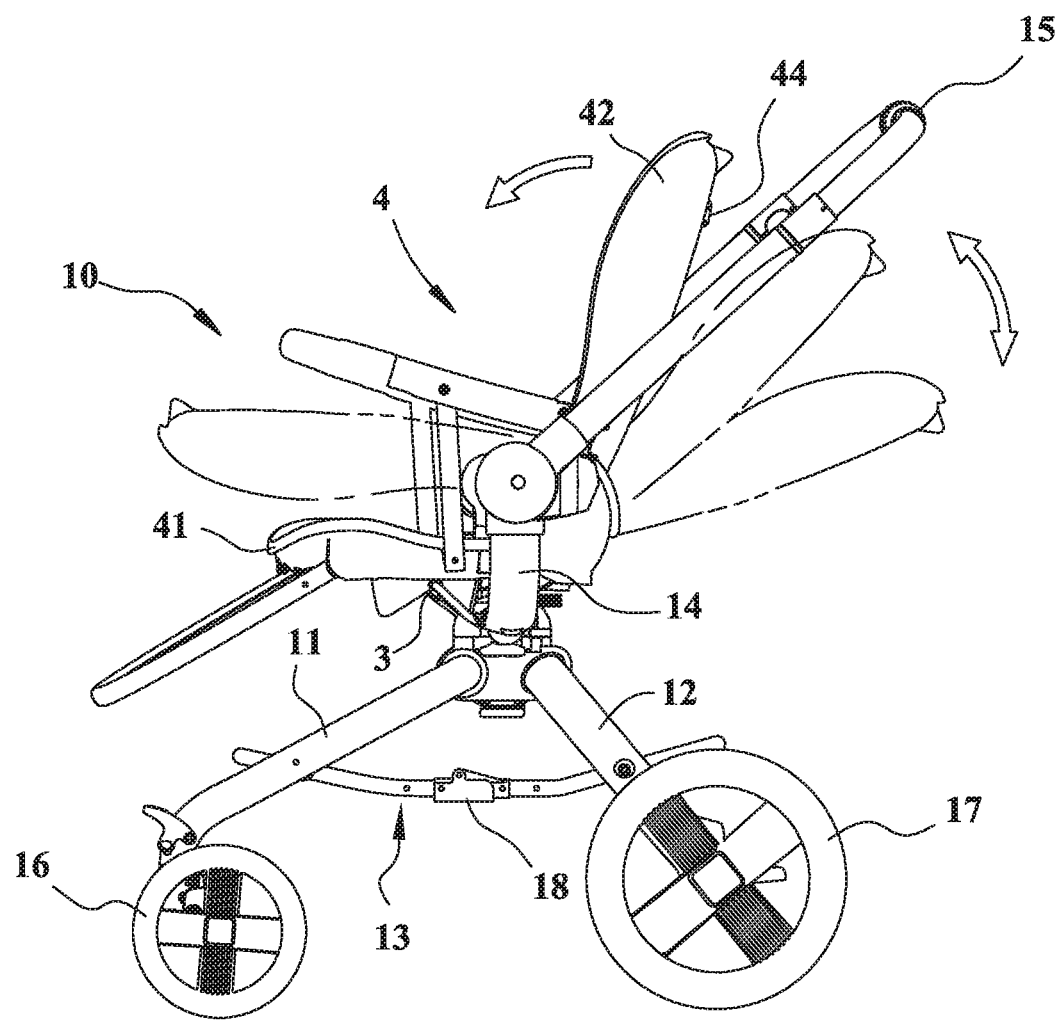
FIG. 9 is schematically illustrating the operation of positioning the seat back of the foldable and detachable seat.

As illustrated in FIGS. 8 and 9, when the limiting member (45) retracted from the multi-positioning mount (43), would permit the seat back (42) to fold into a sharp angle range between 0 degree and 90 degree. When the seat back (42) rotated and closed to the seat base (41) completely, the connecting member (53) pulls the spring-loaded member (51) to disengage from the fixing slot mount (21).

The second engaging mechanism (6) mounted under the seat base (41), comprises an engaging mount (61), a hook member (62), a resilient member (63) and a releasing member (64). The engaging mount (61) provides an engaging slot (65) for receiving the fixing rod (31). The hook member (62) is biased by the resilient member (63), so as to lock the fixing rod (31) within the engaging slot (65). The releasing member (64) may be embodied as a handle which connects with the hook member (62), and can be used to pull the hook member (62) rotate against the resilient member (63) to release the fixing rod (31) from the engaging slot (65).

Figure 10:
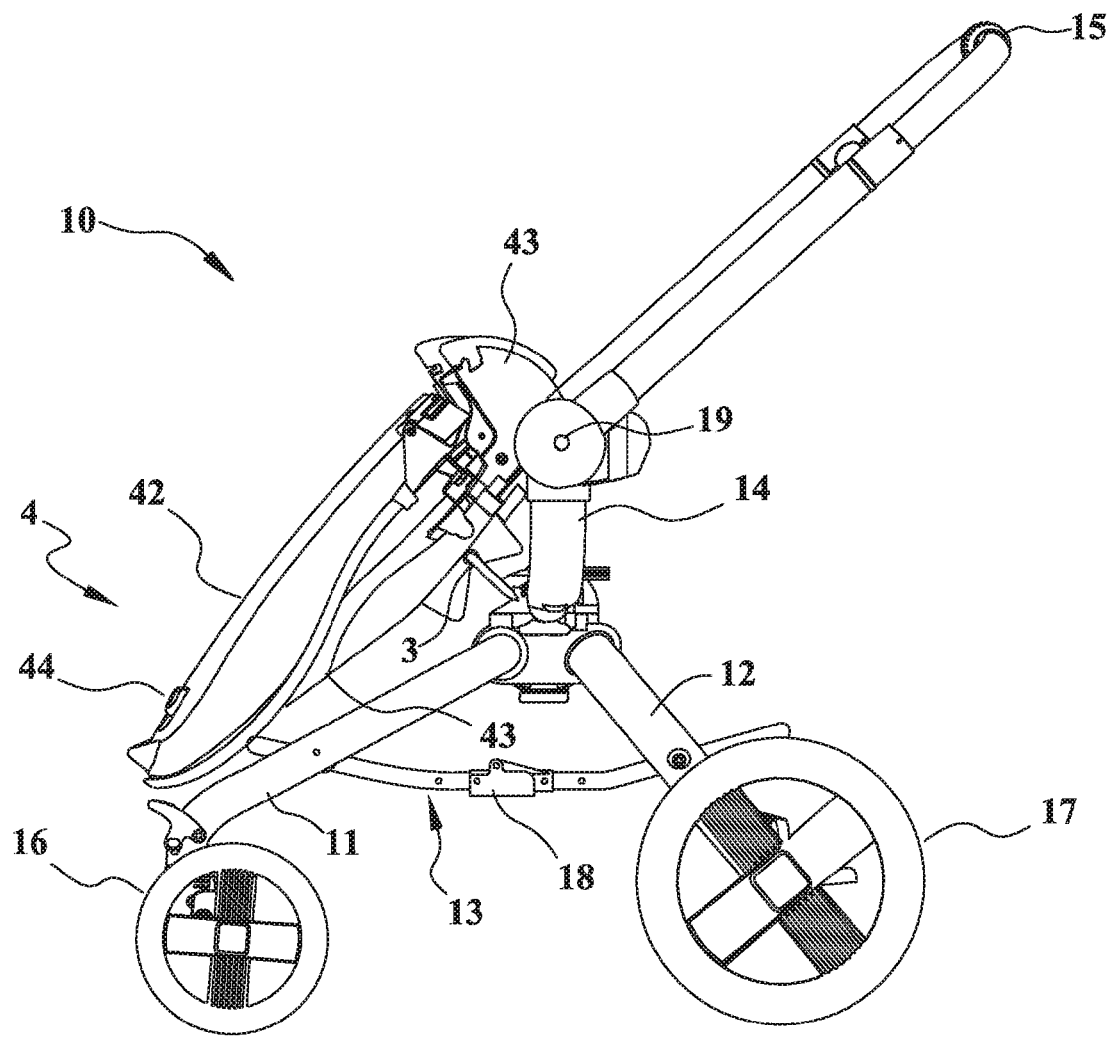
FIG. 10 is schematically illustrating the foldable and detachable seat disengaged from the first engaging site.
Figure 11:
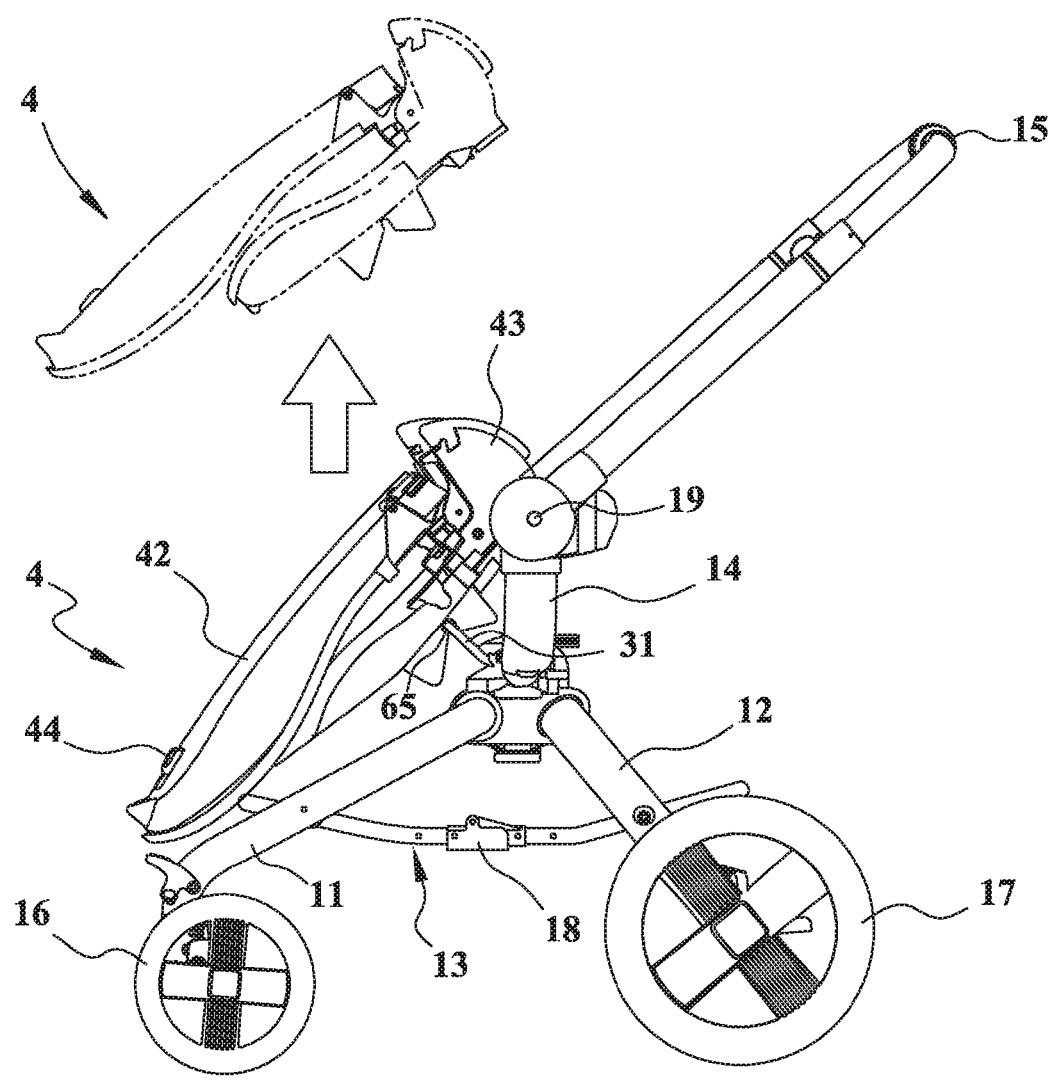
FIG. 11 is schematically illustrating the foldable and detachable seat disengaged from the second engaging site, and being ready for lifting from the stroller frame.

As illustrated in FIGS. 10 and 11, when the first engaging mechanism (5) disengaged from the first connecting site (2) by folding the seat back (42) to the seat base (41), the foldable and detachable seat (4) can rotate about the fixing rod (31), and then disengages from the stroller frame (10) by pull the releasing member (64).

It will become apparent to those people skilled in the art that various modifications and variations can made to the mechanism of the invention without departing from the scope or spirit of the invention. In view of the foregoing description, it is intended that all the modifications and variation fall within the scope of the following appended claims and their equivalents.

What is claimed is:

1. A folding stroller, comprising:
   a stroller frame, having a supporting rack providing a first engaging site and a second engaging site; and
   a foldable and detachable seat, having a seat base and a seat back and capable of connecting to the stroller frame by engaging the first engaging site and the second engaging site, and capable of disengaging from the first engaging site by folding the seat back to the seat base completely, and thereafter disengaging from the second engaging site by pulling a releasing member mounted under the seat base.

2. The folding stroller as claimed in claim 1, wherein the stroller frame has a front strut with a front wheel assembly, and a rear strut with a rear wheel assembly, and wherein the front strut and the rear strut can be rotated to close to each other when folding the folding stroller.

3. The folding stroller as claimed in claim 1, wherein the first engaging site has a pair of fixing slot mount for engaging with the foldable and detachable seat.

4. The folding stroller as claimed in claim 3, wherein the foldable and detachable seat has a spring loaded member capable of engaging with the pair of fixing slot mount, and a connecting member connected between the spring loaded member and the seat back.

5. The folding stroller as claimed in claim 1, wherein the second engaging site has a fixing rod, and the foldable and detachable seat has a engaging mount for engaging with the fixing rod.

6. The folding stroller as claimed in claim 5, wherein the foldable and detachable seat further comprises a hook member and a resilient member, and wherein the resilient member biases the hook member to keep the fixing rod engaged with the engaging mount.

7. The folding stroller as claimed in claim 6, wherein the releasing member is connected with the hook member, when the releasing member is pulled, the fixing rod is released from the engaging mount.

8. The folding stroller as claimed in claim 1, wherein the seat base pivotally connected to the seat back by a multi-positioning mount.

9. The folding stroller as claimed in claim 8, wherein the foldable and detachable seat further includes a limiting member for preventing the seat back and the seat base to rotate within an angle less than 90 degrees.

10. The folding stroller as claimed in claim 8, wherein the foldable and detachable seat further comprises an angle-control mechanism for positioning the seat back relative to the seat base in a selected angle between 90 degrees to 180 degrees.

11. The folding stroller as claimed in claim 1, wherein a push bar is connected with the supporting rack for pushing the folding stroller.

12. The folding stroller as claimed in claim 1, wherein a push bar is connected with the supporting rack by a pivot mount.

* * * * *